(12) United States Patent
Sawka et al.

(10) Patent No.: US 8,857,338 B2
(45) Date of Patent: Oct. 14, 2014

(54) ELECTRODE IGNITION AND CONTROL OF ELECTRICALLY IGNITABLE MATERIALS

(75) Inventors: Wayne N. Sawka, Reno, NV (US); Charles Grix, Citrus Heights, CA (US)

(73) Assignee: Digital Solid State Propulsion LLC, Reno, NV (US)

( * ) Notice: Subject to any disclaimer, the term of this patent is extended or adjusted under 35 U.S.C. 154(b) by 434 days.

(21) Appl. No.: 12/989,639

(22) PCT Filed: May 15, 2009

(86) PCT No.: PCT/US2009/044206
§ 371 (c)(1),
(2), (4) Date: Jan. 7, 2011

(87) PCT Pub. No.: WO2009/140635
PCT Pub. Date: Nov. 19, 2009

(65) Prior Publication Data
US 2011/0259230 A1    Oct. 27, 2011

Related U.S. Application Data

(60) Provisional application No. 61/053,971, filed on May 16, 2008, provisional application No. 61/053,916, filed on May 16, 2008, provisional application No. 61/053,900, filed on May 16, 2008.

(51) Int. Cl.
*F02K 9/95* (2006.01)
*F42C 19/08* (2006.01)
*F23R 7/00* (2006.01)

(52) U.S. Cl.
CPC . *F23R 7/00* (2013.01); *F42C 19/08* (2013.01); *F02K 9/95* (2013.01)
USPC ............................................ 102/202; 60/256

(58) Field of Classification Search
USPC ............ 102/380, 381, 202, 289, 290; 60/259, 60/256
See application file for complete search history.

(56) References Cited

U.S. PATENT DOCUMENTS

| | | | | |
|---|---|---|---|---|
| 3,651,644 | A | * | 3/1972 | Breen et al. .................. 60/203.1 |
| 4,805,400 | A | * | 2/1989 | Knowles ...................... 60/203.1 |
| H001598 | H | * | 10/1996 | O'Reilly et al. ............ 102/202.8 |
| 6,342,092 | B1 | * | 1/2002 | Lichon et al. .................... 96/179 |

(Continued)

OTHER PUBLICATIONS

International Preliminary Report on Patentability received for PCT Patent Application No. PCT/US2009/044206, issued on Nov. 17, 2010, 7 pages.

(Continued)

*Primary Examiner* — Reginald Tillman, Jr.
(74) *Attorney, Agent, or Firm* — Morrison & Foerster LLP

(57) ABSTRACT

Apparatus for providing electrically initiated and/or controlled combustion of electrically ignitable propellants is provided. In one example, the apparatus includes a volume of electrically ignitable propellant (liquid and/or gas) capable of self sustaining combustion, and electrodes operable to ignite the propellant. The apparatus may further include a power supply and controller in electrical communication with the electrodes for supplying a potential across the electrodes to initiate combustion of the propellant and/or control the rate of combustion of the propellant. Various configurations and geometries of the propellant, electrodes, and apparatus are possible. In one example, the electrodes are supplied a direct current, which causes combustion of the propellant at the positive electrode. In another example, the electrodes are supplied an alternating current, which initiates combustion of the propellant at both electrodes.

16 Claims, 14 Drawing Sheets

(56) References Cited

U.S. PATENT DOCUMENTS

| | | | |
|---|---|---|---|
| 6,769,241 B2* | 8/2004 | Spanjers et al. | 60/203.1 |
| 6,817,298 B1 | 11/2004 | Zharkov et al. | |
| 6,996,972 B2* | 2/2006 | Song | 60/202 |
| 2005/0115439 A1 | 6/2005 | Abel et al. | |
| 2006/0185898 A1* | 8/2006 | Seekford | 175/4.6 |
| 2008/0092521 A1* | 4/2008 | Dulligan et al. | 60/254 |

OTHER PUBLICATIONS

International Search Report and Written Opinion received for PCT Patent Application No. PCT/US2009/044206, mailed on Jun. 30, 2009, 8 pages.

* cited by examiner

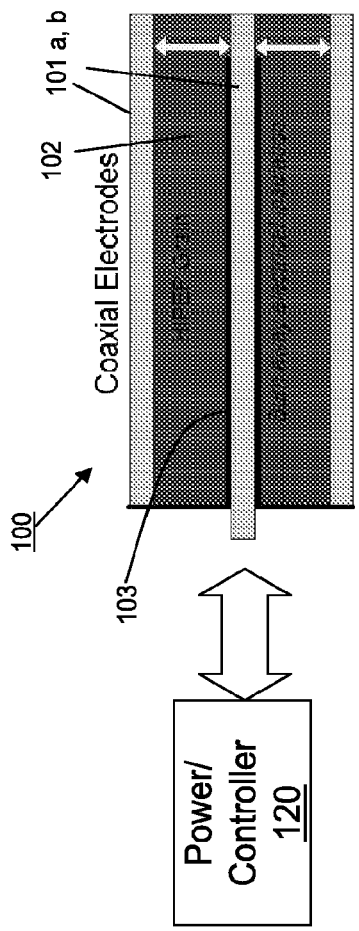
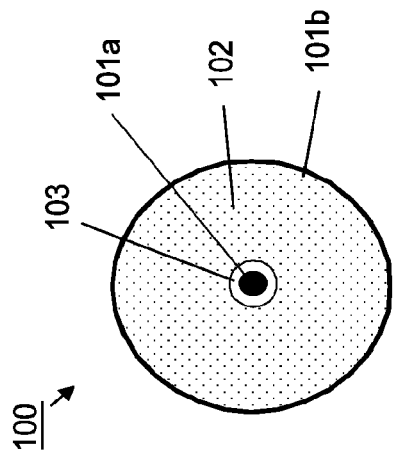
Figure 1A
Figure 1B

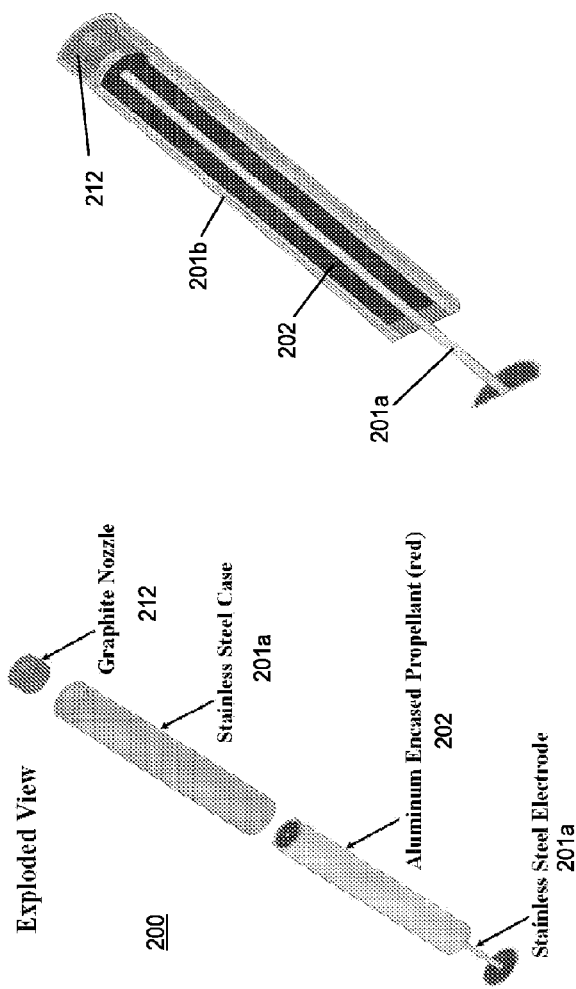
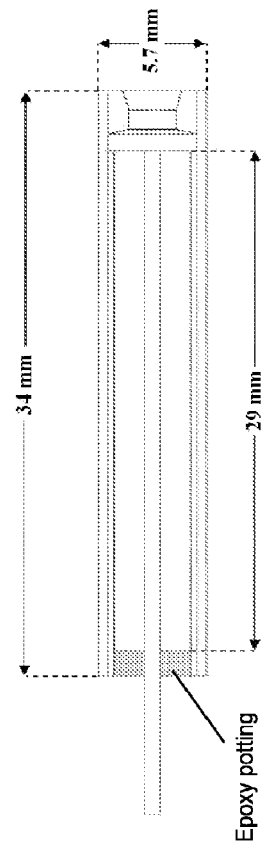
Figure 2A
Figure 2B
Figure 2C

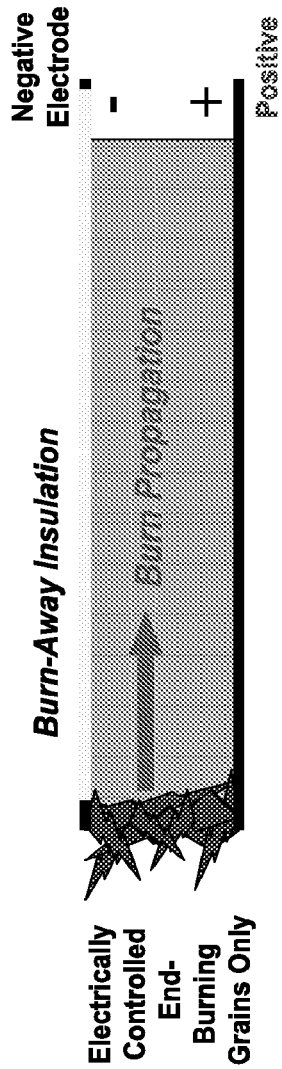 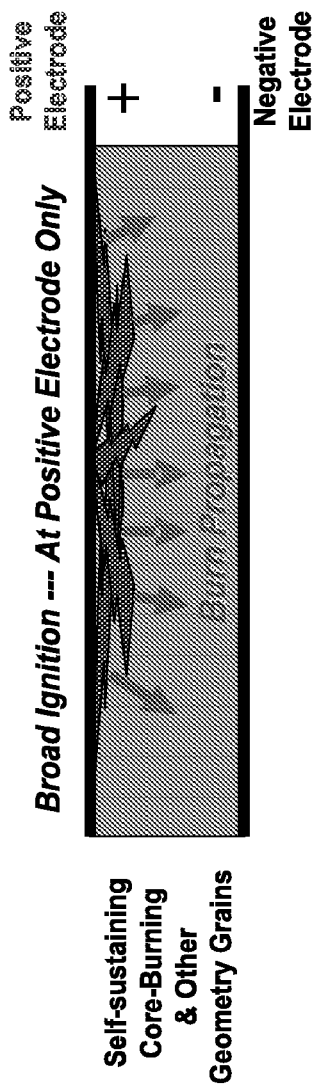
Figure 3A
Figure 3B

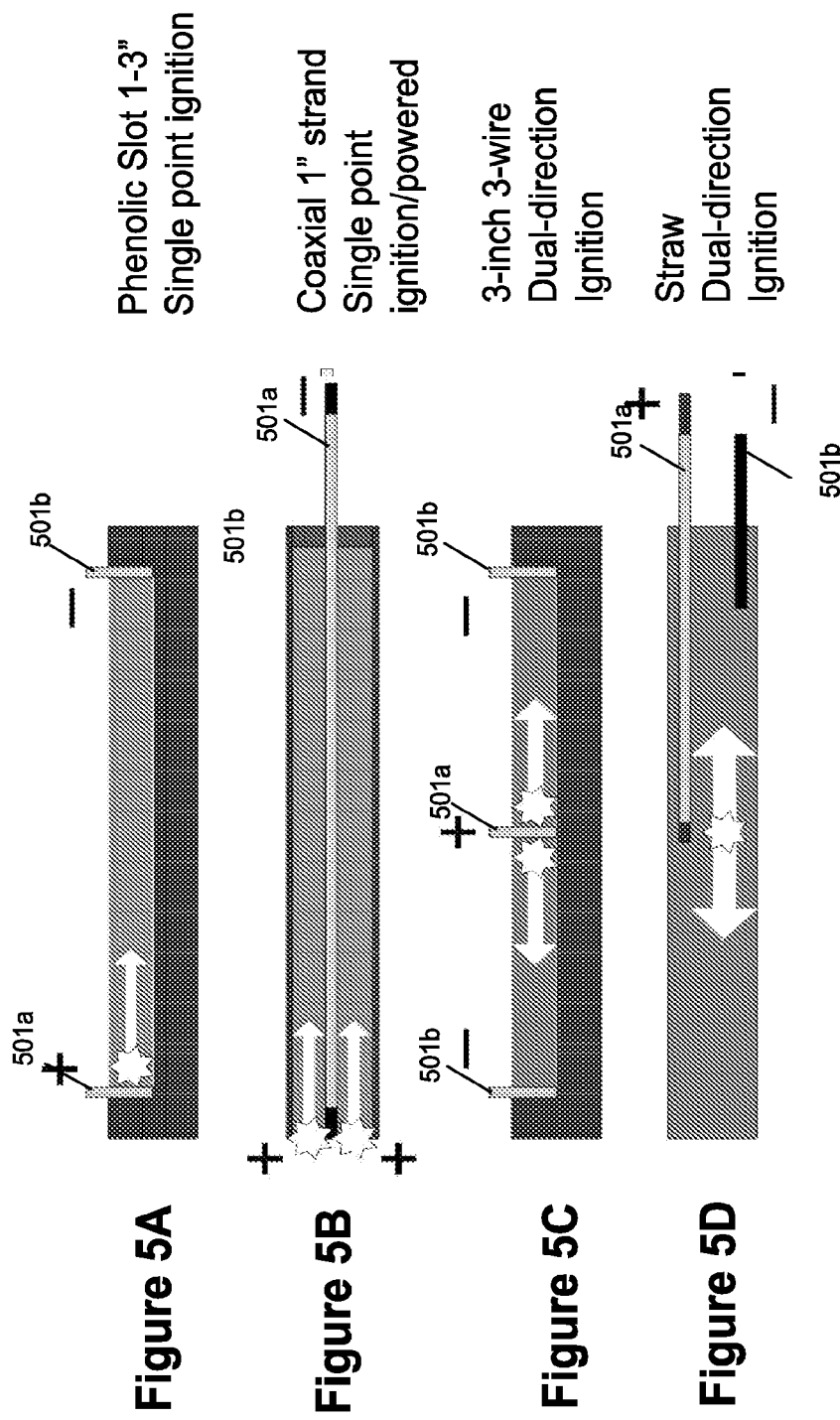

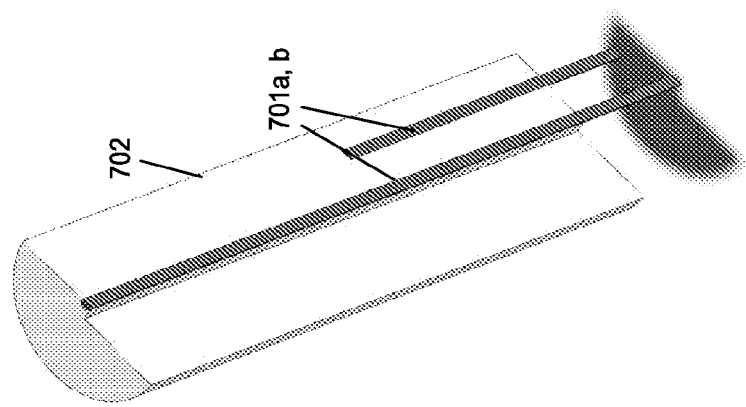
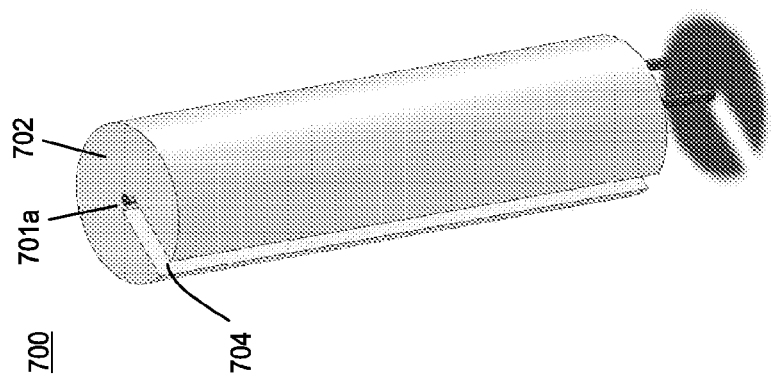
Figure 7

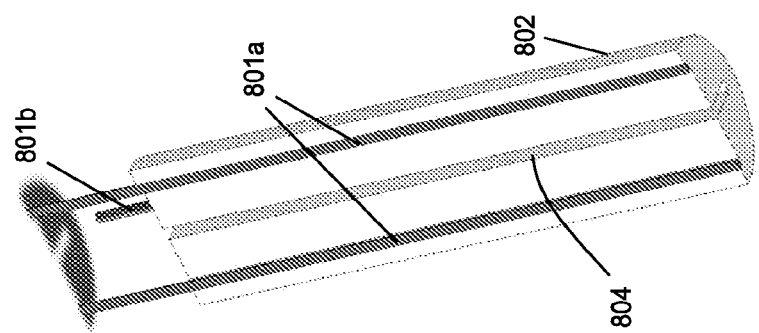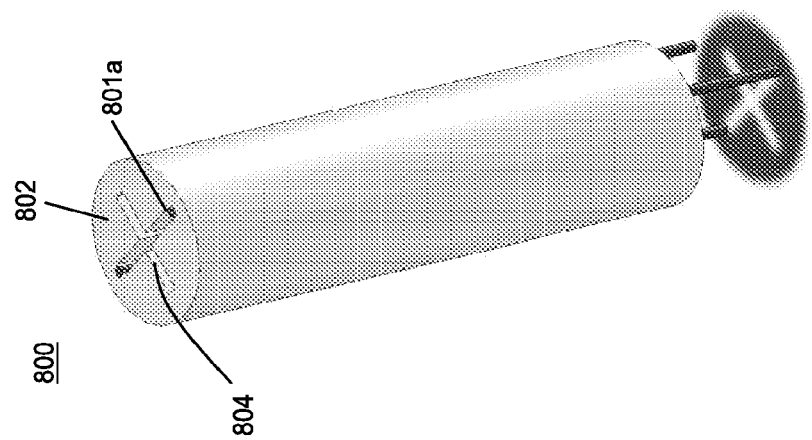
Figure 8

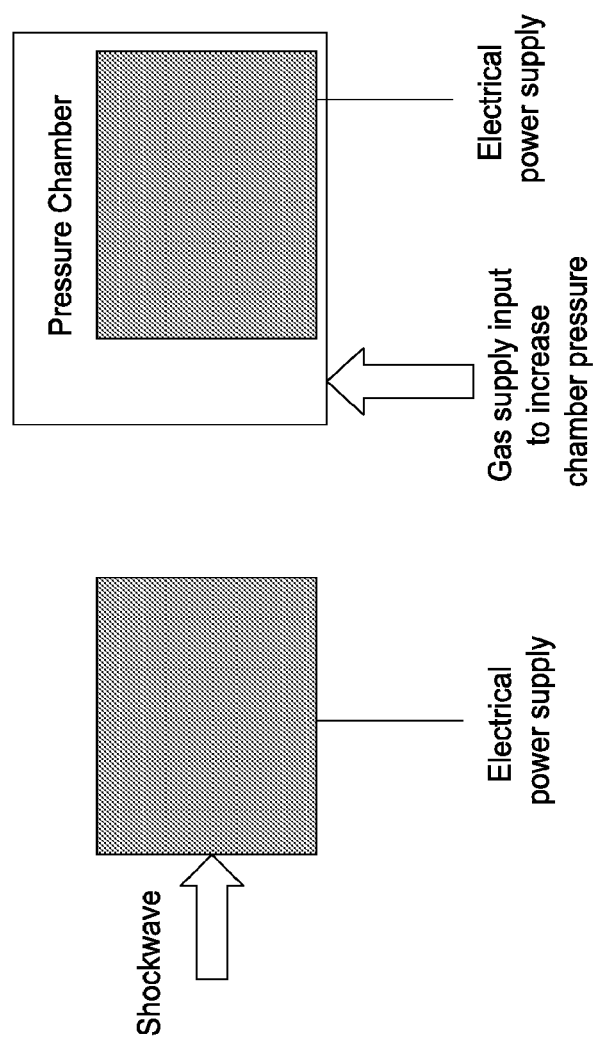

ELECTRODE IGNITION AND CONTROL OF ELECTRICALLY IGNITABLE MATERIALS

RELATED APPLICATIONS

This application claims priority from U.S. provisional patent application Ser. Nos. 61/053,971, filed May 16, 2008, entitled "Electrode Ignition and control of electrically ignitable materials", U.S. Ser. No. 61/053,916, filed May 16, 2008, entitled "Family of Metastable Intermolecular Composites Utilizing Energetic Liquid Oxidizers with NanoParticle Fuels In Gel-Sol Polymer Network", and U.S. Ser. No. 61/053,900, filed on May 16, 2008, "Family of Modifiable High Performance Electrically Ignitable Solid Propellants", all of which are hereby incorporated by reference herein in its entirety for all purposes.

This application is further related to previously filed U.S. patent application Ser. No. 11/305,742, filed Dec. 16, 2005, entitled "CONTROLLABLE DIGITAL SOLID STATE CLUSTER THRUSTERS FOR ROCKET PROPULSION AND GAS GENERATION", which is hereby incorporated by reference herein in its entirety for all purposes. Further, this application is related to three U.S. provisional patent applications filed on May 16, 2008, U.S. Ser. No. 61/053,916, entitled "Family of Metastable Intermolecular Composites Utilizing Energetic Liquid Oxidizers with NanoParticle Fuels In Gel-Sol Polymer Network", U.S. Ser. No. 61/053,900, "Family of Modifiable High Performance Electrically Ignitable Solid Propellants", and U.S. Ser. No. 61/053,956, "Physical Destruction of Electrical Device and Method for Triggering Same", all of which are hereby incorporated by reference herein in their entirety. This application is further related to the following PCT application and US application filed on an even date herewith: U.S. Ser. No. 12/467,209, "Family of Metastable Intermolecular Composites Utilizing Energetic Liquid Oxidizers with NanoParticle Fuels In Gel-Sol Polymer Network," and PCT Ser. No. PCT/US09/44256 "Family of Modifiable High Performance Electrically Controlled Propellants and Explosives," filed on an even date herewith, both of which are incorporated herein by reference.

SECRECY ORDER

The present application incorporates by reference U.S. patent application Ser. Nos. 11/305,742 and 10/136,786, both of which were previously under a secrecy order under 37 CFR 5.2.

STATEMENT REGARDING FEDERALLY SPONSORED RESEARCH OR DEVELOPMENT

Certain aspects described herein were made in part during work supported by a Small Business Innovative Research contract from the United States Navy (N65538-07-M-0119) "Miniaturized Safe-Fuel Electrically Controlled Divert & Attitude Control System" and Office of Naval Research, DE Technologies Inc. subcontract #A630-1341, Tactical Urban Strike Weapon: Safe Fire-From-Enclosure the Marine Alternative to Double-base Propellants. The government may have certain rights in the inventions.

BACKGROUND

1. Field

The present invention relates generally to electrode ignition and control of combustible materials, and in one particular example to electrode ignition and control of an electrically ignitable propellant which may be used for thrusters, motors, gas generators, explosives, igniters, electric matches, pyrotechnic displays, oil field down hole gas generators, fire suppression devices, air bags, electric guns, and the like.

2. Description of Related Art

Digital propulsion systems, and in particular, arrays of microthrusters are known. Generally, a digital propulsion system includes a two-dimensional array of individually addressable thrusters, which may be selectively fired for purposes of propulsion or gas generation. In one example, described generally in "Digital MicroPropulsion", by Lewis et al., Sensors and Actuators A, Physical, 2000, 80(2) pp 143-154, and which is incorporated by reference, an array of microthrusters are formed, where each microthruster includes a micro-resistor, thrust chamber, and rupture diaphragm. A propellant is disposed in the thrust chamber and may be ignited by energizing (and thus heating) the micro-resistor to a sufficient temperature to ignite the propellant. When the propellant is ignited the pressure in the chamber rises until the diaphragm is ruptured, resulting in the ejection of material from the chamber. The ejection of material results in a thrust imparted to the microthruster. Such microthrusters may be manufactured as dies or chips including an array of varying number and sized microthrusters. Further, the microthrusters may be selectively addressed to ignite and impart varying amounts of thrust.

SUMMARY

In one aspect of the present invention an apparatus for providing electrically initiated and/or controlled combustion of electrically ignitable propellants is provided. In one example, the apparatus includes a volume of electrically ignitable propellant (solid and/or liquid), which is capable of self sustaining combustion, and two (or more) electrodes operable to ignite the propellant. The apparatus may further include a power supply and controller in electrical communication with the electrodes for supplying a potential across the electrodes to initiate combustion of the propellant and/or control the rate of combustion of the propellant. For instance, by increasing or decreasing the power and current supplied through the propellant the rate of combustion may be varied.

Various configurations and geometries of the propellant, electrodes, and apparatus are described. In one example, the electrodes are in electrical contact with the electrically ignitable propellant and are supplied a direct current, which may cause combustion of the electrically ignitable propellant at the contact location of the positive electrode with the electrically ignitable propellant. In another example, the electrodes are supplied an alternating current, which may initiate nearly simultaneously combustion of the electrically ignitable propellant at the contact locations of the electrodes with the electrically ignitable propellant. In some examples, one or more of the electrodes may include an insulator material insulating a portion of the electrode from the electrically ignitable propellant (which may burn away with combustion of the propellant).

In some examples, the volume of electrically ignitable propellant includes liquid propellant such as hydroxylammonium nitrate (HAN) propellants. The propellant may be urged (e.g., flowed, streamed, or pumped) to the electrodes for ignition. The liquid propellant may be urged to the electrodes by pumping pressure.

In one example, the apparatus further comprises a pressurization device for increasing pressure on the electrically ignitable propellant, where the current required for igniting the electrically ignitable propellant is reduced with increased pressure thereon. Further, in one example, the current required for igniting the propellant cannot (or will not) be met by the apparatus absent the increase in pressure from the pressurization device. Such an apparatus may provide for a safe, two-stage ignition, e.g., requiring both the pressurization device and the electrodes to be activated to initiate combustion. The pressurization device may include one or more of an explosive charge, shock impact, compressed gas, pneumatic pressurization, or valve operable to at least temporarily increase the pressure on the propellant.

In other examples, multiple volumes of propellant (or "grains") may be included in a common assembly to provide a two or three dimensional array of combustion volumes. Such an assembly may include a plurality of grain elements, each grain element comprising a volume of electrically ignitable propellant capable of self sustaining combustion, and electrodes associated with the plurality of grain elements, the electrodes adapted for selectively igniting at least one of the plurality of grain elements. In one example, the electrodes may include a common ground and multiple positive electrodes for selectively or entirely combusting the plurality of grain elements.

The present inventions and various aspects are better understood upon consideration of the detailed description below in conjunction with the accompanying drawings and claims.

BRIEF DESCRIPTION OF THE FIGURES

FIGS. 1A and 1B illustrate cross-sectional side and top views, respectively, of a first exemplary structure including electrodes and an electrically ignitable propellant.

FIGS. 2A-2C illustrate an exploded view, perspective cross-sectional side view, and cross-sectional side view, respectively, of a second exemplary structure including electrodes and an electrically ignitable propellant.

FIGS. 3A and 3B illustrate exemplary ignition processes of electrical propellant for different electrode configurations.

FIGS. 5A-5D illustrate exemplary structures and geometries for electrodes and electrically ignitable propellant.

FIG. 7 illustrates perspective and cross-sectional views of an exemplary "slot burning" structure including wire electrodes and electrically ignitable propellant.

FIG. 8 illustrates perspective and cross-sectional views of an exemplary "star" geometry structure including wire electrodes and electrically ignitable propellant.

FIGS. 11A and 11B illustrate two exemplary methods of initiation of electrically ignitable propellant using pressure and electrical power.

DETAILED DESCRIPTION

Figure 2D:
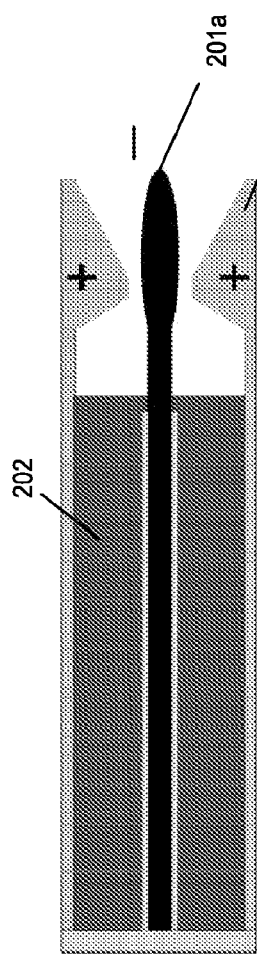
FIGS. 2D and 2E illustrate cross-sectional side views of another exemplary structure including an electrically ignitable propellant and an electrode extending through the nozzle/exhaust region of the structure.

The following description is presented to enable a person of ordinary skill in the art to make and use various aspects and examples of the present invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

In one aspect of the present invention, structures and systems for electrical ignition and/or control of solid or liquid propellants are described. In one example, a structure includes energetic materials that may be broadly described as electrically ignitable propellants (for example, as described in Nos. 10/136,786, 10/423,072, 11/787,001, and 08/758,431 to Katzakian et al., and in "Family of Modifiable High Performance Electrically Controlled Propellants and Explosives" and "Family of Metastable Intermolecular Composites Utilizing Energetic Liquid Oxidizers with NanoParticle Fuels In Gel-Sol Polymer Network," incorporated herein by reference, which can be ignited and controlled, at least in part, by the application of electrical power as an electrical circuit (and not an uncontrolled pyrotechnic). For example, passing electrical current through the propellant causes ignition/combustion to occur at/along electrode surfaces. The use of an electrically ignitable propellant obviates the need for igniters (e.g., spark or other thermal igniters such as resistor elements or the like) to initiate propellant combustion. Accordingly, in examples described herein, combustion of a specific volume of propellant (referred to herein as a "grain" or "grain element" of propellant) is initiated and/or controlled by electrical power between electrodes and through the propellant. Generally, electrical power from a direct current (DC) source can be operated to cause combustion to occur at and/or along the positive electrode, and DC power and electrode polarity can be used to spread the flame front across an end surface of the propellant. Additionally, electrical power from an alternating current (AC) power source can be controlled to cause combustion to occur at both electrodes.

In some examples, electrical ignition of the material occurring along one or more electrodes can be modified or controlled using burn-away electrical insulators such as Teflon, polyethylene, or the like. Further, by varying the number of ignition electrodes, polarities, and/or their geometry, the propellant burn rate can be altered, up to and including the explosive yield, efficiency, or rate. Exemplary geometries include, but are not limited to, coaxial grains, sheets and plates, rolled sheets or jellyrolls, core burning grains, slot burning grains, star burning grains, straw burning grains, single or multi-electrode end-burning grains, wired end-burners, and the like.

Further, in some examples, a controller or power source may be operable to control the electrodes to ignite the propellant as well as control the burn rate of the propellant. For instance, by varying the electrical power and current passing through the propellant, the burn or combustion rate can be varied and increased above the self sustained combustion rate of the propellant up to and including supersonic-explosive rates. Further, stored electrical charge supplied by the electrodes can be used to vary the burning rate up to and including the explosive yield, efficiency, or rate of the energetic material.

In some examples, the exemplary structures and propellant can be used in combination with a compression device such as a pyrotechnic/explosive charge (e.g., squibs, electric matches, blasting caps, detonators, or the like), shock impact, compressed gas pneumatic pressurization and/or valve, including pressure burst disks to increase reaction pressures and cause faster ignition of the energetic material at and along the electrodes. For instance, the threshold current for initiating combustion of some of the exemplary propellants decreases with increasing pressure. The structure including the propellant may be included with a compression device to form a safe two-stage ignition system for the propellant. For example, a power supply may provide the propellant with insufficient electrical power to ignite at normal environment pressures, but sufficient to ignite when the compression device is also activated. Likewise, the pressure increase (and/or heat) from the compression device will not cause ignition of the energetic material with the electrical power being supplied.

Exemplary structures described herein may be applicable to various fields including, but not limited to, defense, aerospace, liquid (monopropellant) rocket engines, automotives, air bags, electronics, blasting (mining/oil field services, e.g., oil field down hole gas generators for rock fracturing and enhanced oil/gas recovery), electric guns, industrial tools, fire suppression, entertainment-special effects, and the like. In one particular example, the structures may be used to ignite, throttle, extinguish, and re-start the combustion of high performance solid or liquid rocket propellants. Additionally, exemplary methods and systems may be used as gas generators in a variety of applications. Various examples described herein may be used in rockets, missiles, spacecraft, aircraft, sea-craft, oil/gas field services, and land vehicles for propulsion or as an on-demand gas generator. The ability to control propellant burn rate further allows tailoring of the pressure wave to specific rock lithology for maximum facture propagation as described in R. A. Schmidt, N. R. Warpinski and P. W. Cooper: In Situ Evaluation of Several Tailored-pulse Wellshooting Concepts, SPE/DOE 8934 pp 105-116 Symposium on Unconventional Gas Recovery, Pittsburgh, Pa. May 18-21 1980, which is incorporated herein by reference.

Apparatus described herein, including an electrically ignitable propellant, may be desirable because they are electrically controllable and in many examples have no moving parts. Grain elements can also be stacked into three-dimensional arrays, without the need to separate or channel hot combustion gases away from adjacent unused propellant grains. Scaling of manufacturing methods spans from those of the semiconductor industry for microchips, such as photo etching and chemical vapor deposition, upwards to drill, stamped, or molded dies layered together for larger devices. These manufacturing methods may allow mass production of these devices at relatively lower cost compared to conventional thruster devices.

FIGS. 1A and 1B illustrate cross-sectional side and top views, respectively, of a first exemplary structure 100 including an electrically ignitable propellant 102. In this example, structure 100 includes a single grain element or volume of electrically ignitable propellant 102 to be ignited and/or controlled by electrodes 101a and 101b. In operation, electrodes 101a and 101b conduct current through the electrically ignitable propellant 102 causing combustion thereof. In this particular example, the center electrode 101b includes an insulator 103 to control the combustion of propellant 102; in particular, the application of voltage to electrodes 101a and 101b initiates combustion at the end of the structure 100 (to the right in FIG. 1A). As combustion of propellant 102 begins insulation 103 burns away. As described in greater detail below, the polarities and configuration of electrodes 100a, b, and insulation 103 may be varied to ignite and control the combustion in various fashions.

Propellant 102 may be disposed with electrode 101a (or a suitable housing, not shown) in any manner, for example, cast, poured, vacuum poured or the like into electrode 101a or other suitable housing. The separation between electrodes 101a and 101b may be varied for efficient combustion of propellant 102, which may include HIPEP propellant (High Performance Electric Propellant). HIPEP propellant is described, for example, in AFRL-PR-ED-TR-2004-0076, "High Performance Electrically Controlled Solution Solid Propellant," Arthur Katzakian and Charles Grix, Final Report, the entire content of which is incorporated by reference herein. Further, suitable propellants include those described in "U.S. Ser. No. 12/467,209, "Family of Metastable Intermolecular Composites Utilizing Energetic Liquid Oxidizers with NanoParticle Fuels In Gel-Sol Polymer Network," and PCT Ser. No. PCT/US09/44256 "Family of Modifiable High Performance Electrically Controlled Propellants and Explosives," filed on an even date herewith and incorporated by reference. In some examples, the propellant is generally flexible when cured (e.g., is the case for HIPEP propellant) and can be used with flexible foils or thin metal layers for electrodes 101a and 101b to form various configurations, such as spiral shapes or jelly roll designs.

The material of electrodes 101a and 101b, e.g., aluminum or other suitable material, may be consumed during combustion of propellant 102, thereby increasing the specific impulse of the thruster or other device. In other examples, electrodes 101a and 101b may include stainless steel or the like so as to not be consumed by the combustion. Additionally, insulation layer 103, which may include Teflon or Phenolic coatings, may also be combusted with propellant 102. As seen in FIG. 1A, insulation 103 does not extend to the end of electrode 101a such that a portion of propellant 102 contacts opposing electrodes 101a and 101b near the axial face of structure 100. The insulation layer 103 burns away in front of the flame front, thereby sustaining a contact between electrodes 101a and 101b and propellant 102. The power supplied to electrodes 101a and 101b may be stopped or varied as described herein to control the rate of combustion of propellant 102.

An exhaust port can be positioned generally at the axial top and/or bottom axial face of structure 100. In one example, a housing (not shown) may be included to cover the bottom axial surface of structure 100 such that as propellant 102 is ignited and combusted from the top axial surface and proceeds downward. Further, multiple structures 100 may be grouped or clustered together using a common electrical ground to provide individual combustion control (via controller 120, which may or may not include a power source) with fewer wires. Such clusters may be potted in a suitable matrix forming a unified solid-state device.

In other examples, such as described below with respect to FIG. 12, propellant may include a liquid propellant. Such a device may operate similar to that described for a solid propellant. Further, in some examples, the liquid propellant may be flowed, streamed, pumped, or otherwise urged to electrodes 101a and 101b for combustion thereof.

FIGS. 2A-2C illustrate an exploded view, perspective cross-sectional side view, and cross-sectional side view, respectively, of a second exemplary structure 200 including electrodes and an electrically ignitable propellant. In this example, structure 200 includes stainless steel electrodes 201a and 201b, electrode 201b formed of a stainless steel case enclosing an aluminum encased propellant 202.

Further, structure 200 includes a nozzle 212, which may be made of graphite. Nozzle 212 may be designed and used to control combustion or gas generation of structure 200 as will be understood by those of ordinary skill in the art. Further, in configurations where combustion occurs at two or more openings, two or more nozzles may be used. In another example, not shown, electrode 201a may extend within nozzle 212, which may assist in combusting any propellant particles which are ejected without being ignited and come into sufficient electrical contact with electrode 201a and nozzle 212 and/or electrode 210b to pass current there through.

Figure 2E:
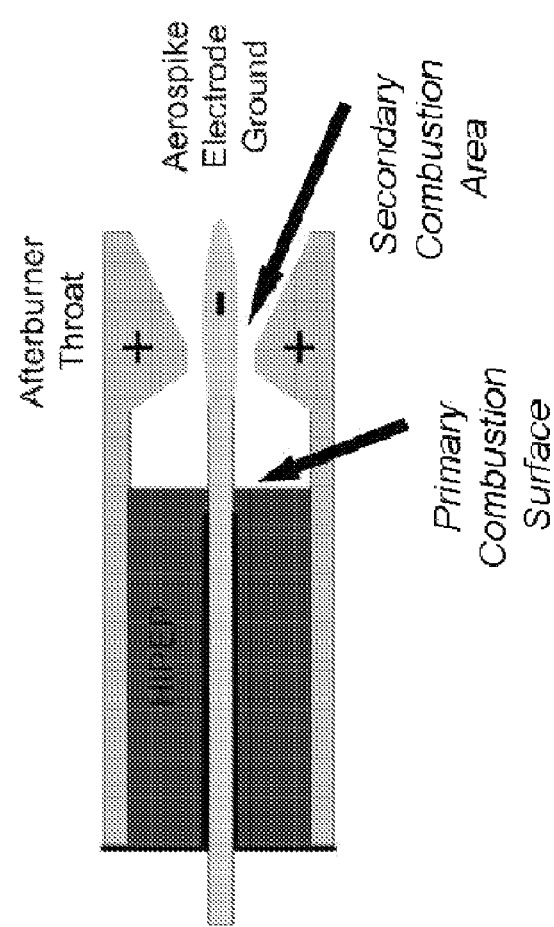

FIGS. 2D and 2E illustrate cross-sectional side views of another exemplary structure 201, which include an electrically ignitable propellant 202 and an electrode 201a extending through a nozzle or exhaust region of the structure, e.g., through an afterburner throat region. The extension of electrode 201a through the end region prevents may reduce clogging (and potentially subsequent explosion) by causing the (re)ignition of any incompletely combusted propellant.

FIGS. 3A and 3B illustrate exemplary ignition processes of electrical propellant for different apparatus configurations. FIG. 3A illustrates the combustion process for a structure similar to that of FIG. 1, having an insulated center anode configuration. This particular structure and configuration results in combustion of propellant to spread across the grain-end to the outer cathode. The combustion of the propellant propagates to the left along the axis of the structure, in a generally uniform manner as illustrated.

In contrast, and with reference to FIG. 3B, with a reverse polarity and with an un-insulated axial electrode, the propellant is broadly ignited along much of or the entire length of the positive electrode as shown (it is noted that that for clarity only one side of the outer case/electrode is shown). Accordingly, by varying the polarity and apparatus (e.g., with or without burn-away insulation), various combustion processes may be achieved.

Figure 4A:
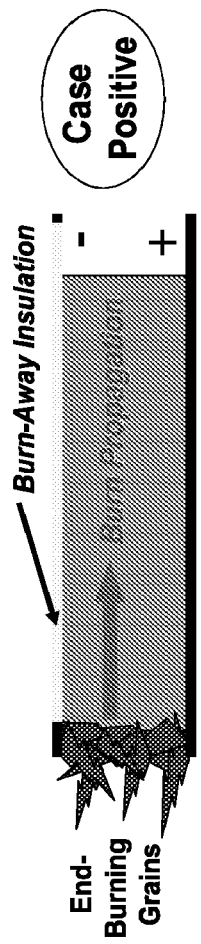
FIGS. 4A and 4B illustrate exemplary ignition processes of electrical propellant for different electrode configurations.
Figure 4B:
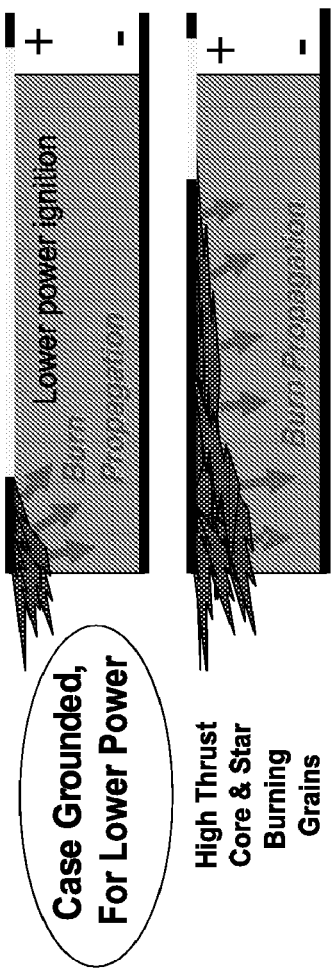

FIGS. 4A and 4B illustrate exemplary ignition processes of electrical propellant for different polarities of the electrodes (it is again noted that for clarity only one side of the outer case/electrode is shown). Reversing the polarity of the electrodes for an exemplary structure including burn-away insulation alters the burn geometry from end-burning to core burning.

FIGS. 5A-5D illustrate exemplary structures including electrodes 501a and 501b and electrically ignitable propellant for various polarities and physical configurations. In these examples, electric burn strand types are illustrated to indicate ignition and propagation using inert electrodes (e.g., stainless steel). In these examples, electrode 501a is positive and electrode 501b is grounded, where electrical power conducts through the propellant to ignite at the positive electrode.

Figure 6:
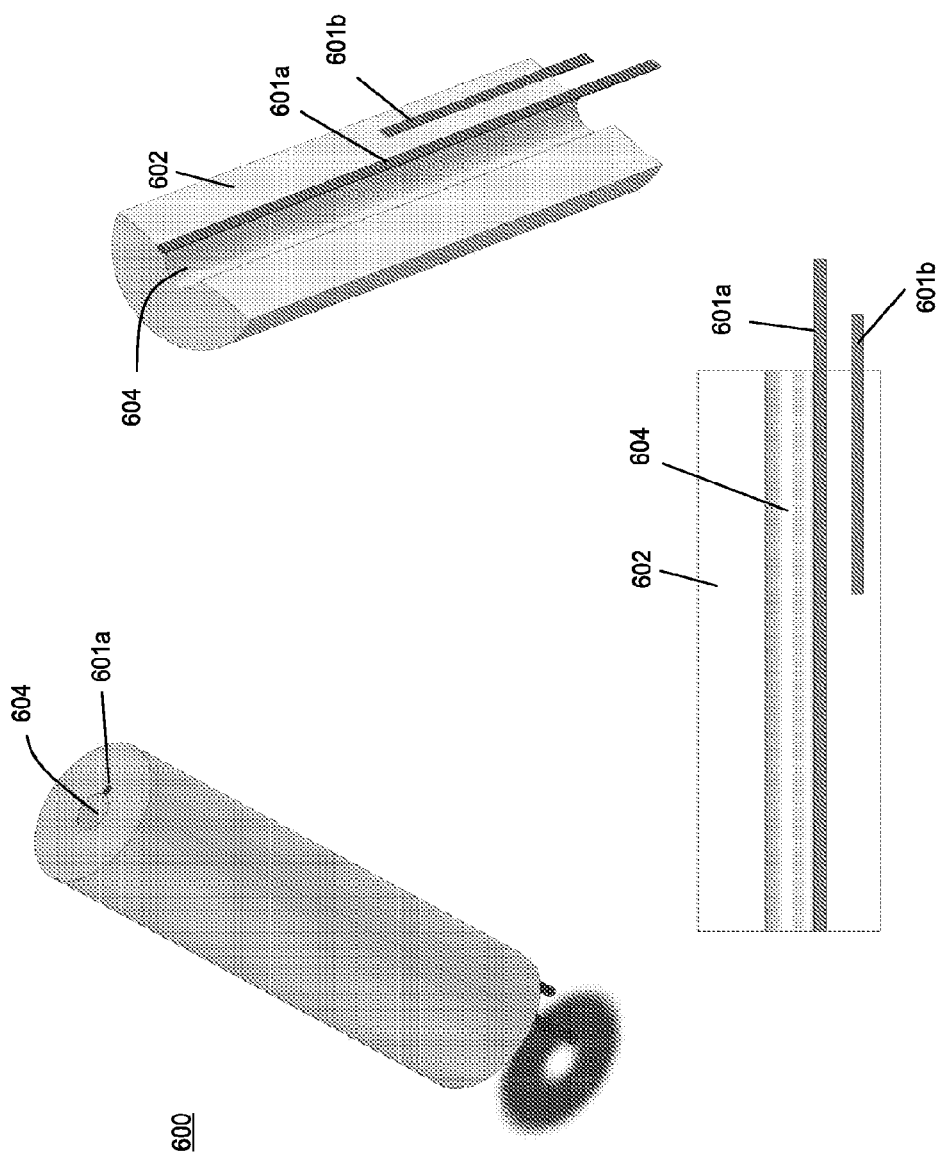
FIG. 6 illustrates perspective and cross-sectional views of an exemplary "core burning" structure including wire electrodes and electrically ignitable propellant.

FIG. 6 illustrates an exemplary "core burning" structure 600 including wire electrodes 601a, b and electrically ignitable propellant 602 having a core region 604 for combustion gases to escape (it is noted that insulation, e.g., on the positive electrode 601a, has been excluded here for clarity). In other examples, electrodes 601a, b can also be in the form of flat sheets or foils to create a higher surface area of ignition (not shown). The core region 604 may be formed after the propellant is disposed in the structure by drilling, etching, milling, laser milling, or other suitable material removal processes. Further, as will be recognized by those of ordinary skill in the art, a casing or housing, nozzle(s), controller, powers supply, compression device, and other structures may be included with the exemplary structure shown. The core region 604 may be aligned at least partially with an aperture in a housing to assist in channeling gas and heat through a port or nozzle.

FIG. 7 illustrates an exemplary "slot burning" structure 700 including wire electrodes 701a, b and electrically ignitable propellant 702 including a slot 704 formed therein. Slot 704 may provide for combustion gases to escape the structure. Slot 704 may be formed after the propellant is disposed in the structure by drilling, etching, milling, laser milling, or other suitable material removal processes. Further, as will be recognized by those of ordinary skill in the art, a casing or housing, nozzle(s), controller, powers supply, compression device, and other structures may be included with the exemplary structure shown.

FIG. 8 illustrates an exemplary "star" geometry structure 800 including wire electrodes 801a, b and electrically ignitable propellant 802 having an open "star" region 804 formed therein. The exemplary geometry can use one or more ignition electrodes, e.g., one or more positive electrodes 801a, with a single grounded electrode 801b. Region 804 may be formed after the propellant is disposed in the structure by drilling, etching, milling, laser milling, or other suitable material removal processes. Further, as will be recognized by those of ordinary skill in the art, a casing or housing, nozzle(s), controller, powers supply, compression device, and other structures may be included with the exemplary structure shown.

Figure 9:
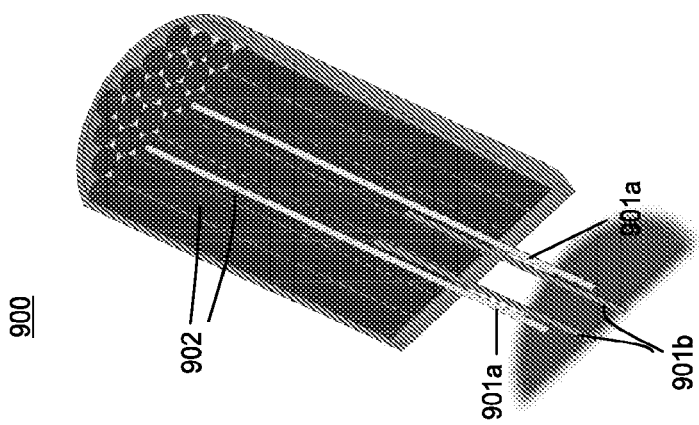
FIG. 9 illustrates an exemplary "straw" structure including wire electrodes and electrically ignitable propellant.

FIG. 9 illustrates an exemplary "straw" structure 900 including wire electrodes 901a, b (901a positive and 901b negative in this example) and a plurality of electrically ignitable propellant grains 902. Positive electrodes 901a are illustrated extending substantially or completely along the length of a straw grain 902 such that combustion begins at the far end of positive electrode 901b (where electrode 901b includes insulation, not shown, extending nearly to the end thereof). One or more straw grains 902 may include electrodes, where during operation igniting one grain may cause the remaining grains 902 to combust. Multiple positive and negative electrodes can be used to vary the combustion process and ensure uniform and complete combustion of grains 902.

Figure 10:
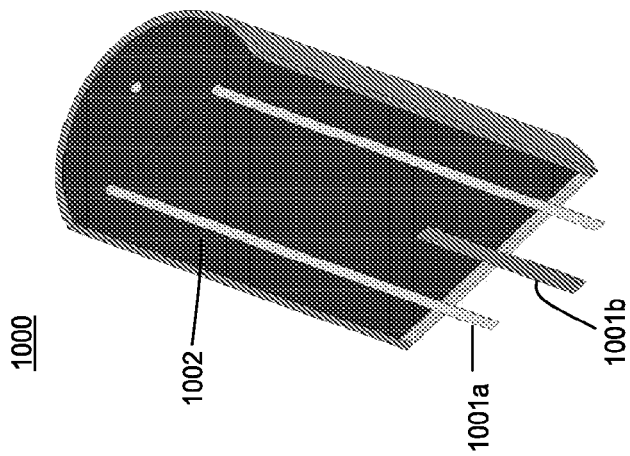
FIG. 10 illustrates an exemplary "end-burner" structure including wire electrodes and electrically ignitable propellant.

FIG. 10 illustrates an exemplary "end-burner" structure 1000 including wire electrodes 1001a, b (1001a positive and 1001b negative in this example) and electrically ignitable propellant 1002. In this example, the structure may include only a single ground electrode 1001b and one or more positive electrodes 1001a. The wired end-burner design also has fewer wires, requiring only one ground. For example, with respect to FIG. 9, each grain 902 may be separately encased or isolated from other grains 902 such that each may be selectively and individually ignited and combusted.

FIGS. 11A and 11B illustrate two exemplary methods of initiating combustion of electric solid propellant 1100, which may include any structure described herein, using pressure and electrical power. For instance, the exemplary structures and propellant can be used in combination with a compression device such as a pyrotechnic/explosive charge (e.g., squibs, electric matches, blasting caps, detonators, or the like), shock impact, compressed gas pneumatic pressurization and/or valve, including pressure burst disks to increase reaction pressures and cause faster ignition of the energetic material at and along the electrodes. For instance, the threshold current for initiating combustion of some of the exemplary propellants decreases with increasing pressure. The structure including the propellant may be included with a compression device to form a safe two-stage ignition system for the propellant. For example, a power supply may provide the propellant with insufficient electrical power to ignite at normal environment pressures, but sufficient to ignite when the compression device is also activated. Likewise, the pressure increase (and/or heat) from the compression device will not cause ignition of the energetic material with the electrical power being supplied. As the pressure is increased from a shockwave (FIG. 11A) or increase in pressure within a pressure chamber (FIG. 11B) combustion is initiated.

Figure 12:
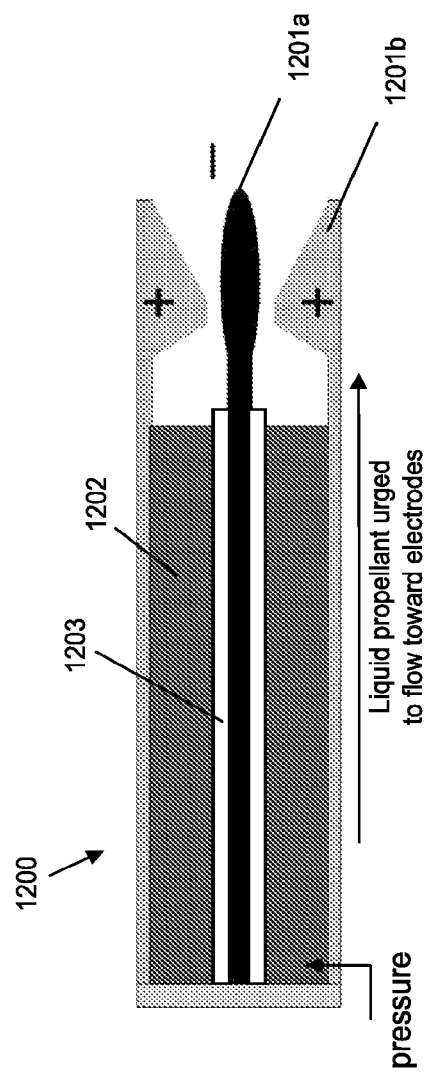
FIG. 12 illustrates an exemplary structure for initiation of electrically ignitable liquid propellant.

FIG. 12 illustrates an exemplary structure for initiation of electrically ignitable liquid propellant. In this particular example, liquid propellant 1202 is contained within the structure 1200 and urged to flow past the electrodes 1201a and 1201b. Electrode 1201a may further include an insulator 1203 disposed therewith that will not burn away, in one example, such that liquid propellant 1202 will only be combusted when urged past the electrodes 1201a and 1201b at the distal or nozzle end of structure 1200.

In one example, pressure may be introduced to structure 1200 to urge or pump the liquid propellant 1202 to and past electrodes 1201a and 1201b. The liquid propellant may be urged to flow to electrodes 1201a and 1201b in various other manners including mechanical (e.g., a plunger or other mechanical devices), gravity, pressure differentials, magnetic fields, or the like. Further, the rate at which liquid propellant 1202 is urged to electrodes 1201a and 1201b may be controlled or ceased by a controller to vary the rate of combustion thereof.

In some examples, the volume of electrically ignitable propellant includes liquid propellant such as hydroxylammonium nitrate (HAN) propellants, propellants described in the applications referenced herein, and other pyroelectric materials such as polyvinylidene fluoride, poly vinylidene fluoride-trifluoroethylene copolymers, and the like.

Electrically ignitable solid and liquid propellants may have various advantageous uses in oil and gas field applications. For instance, the use of small, electrically controllable explosives may provide advantages for fracturing oil and gas wells in terms of safety and predictability, and without excessive wellbore damage relative to traditional high explosives such as nitroglycerine or gelatin. Further, the use of liquid propellants, as described herein, may be used to enter small diameter cracks and holes and detonated to create reservoirs. In particular, liquid propellant may be pumped or flowed into cracks (which may be created initially by hydraulic or explosives methods) associated with a well or well region and electrically ignited. The explosion may stimulate the well and increase the oil or gas reservoir for extraction.

Figure 13:
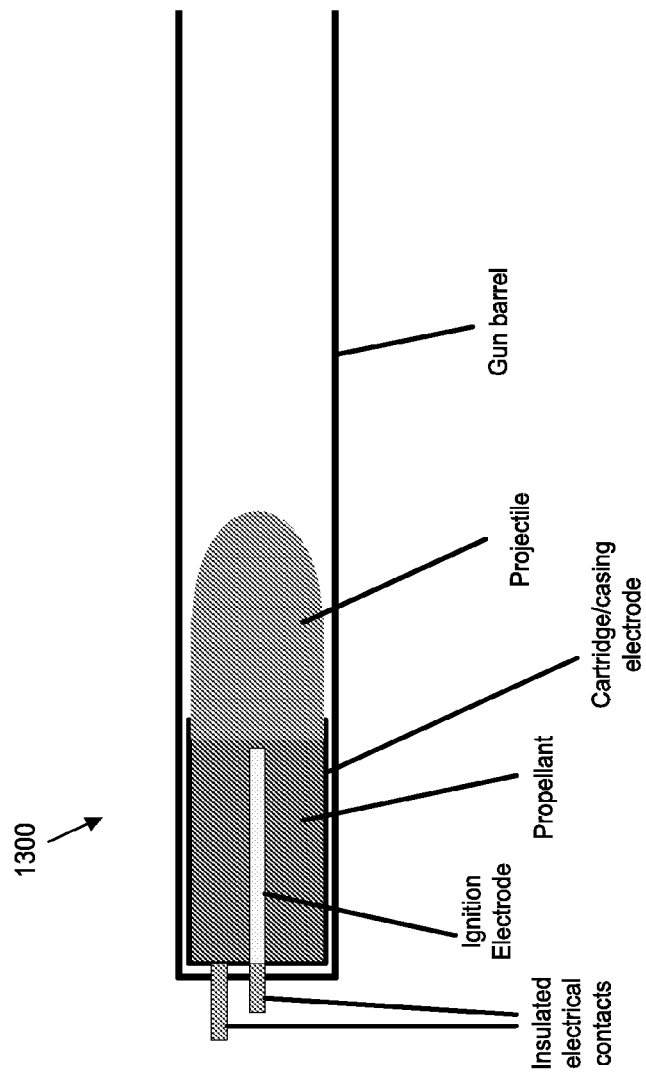
FIG. 13 illustrates an exemplary structure and device for an electrically ignitable projectile or gun.

Another exemplary application of the structures and methods described herein includes an electronic projectile or gun apparatus. For instance, FIG. 13 illustrates an exemplary structure 1300 for an electrically ignitable projectile or gun. As illustrated, a volume of electrically ignitable propellant is suitable connected to electrodes and disposed within the structure to propel a projectile when ignited, e.g., the combustion of the propellant propelling the projectile from the barrel.

Figure 14:
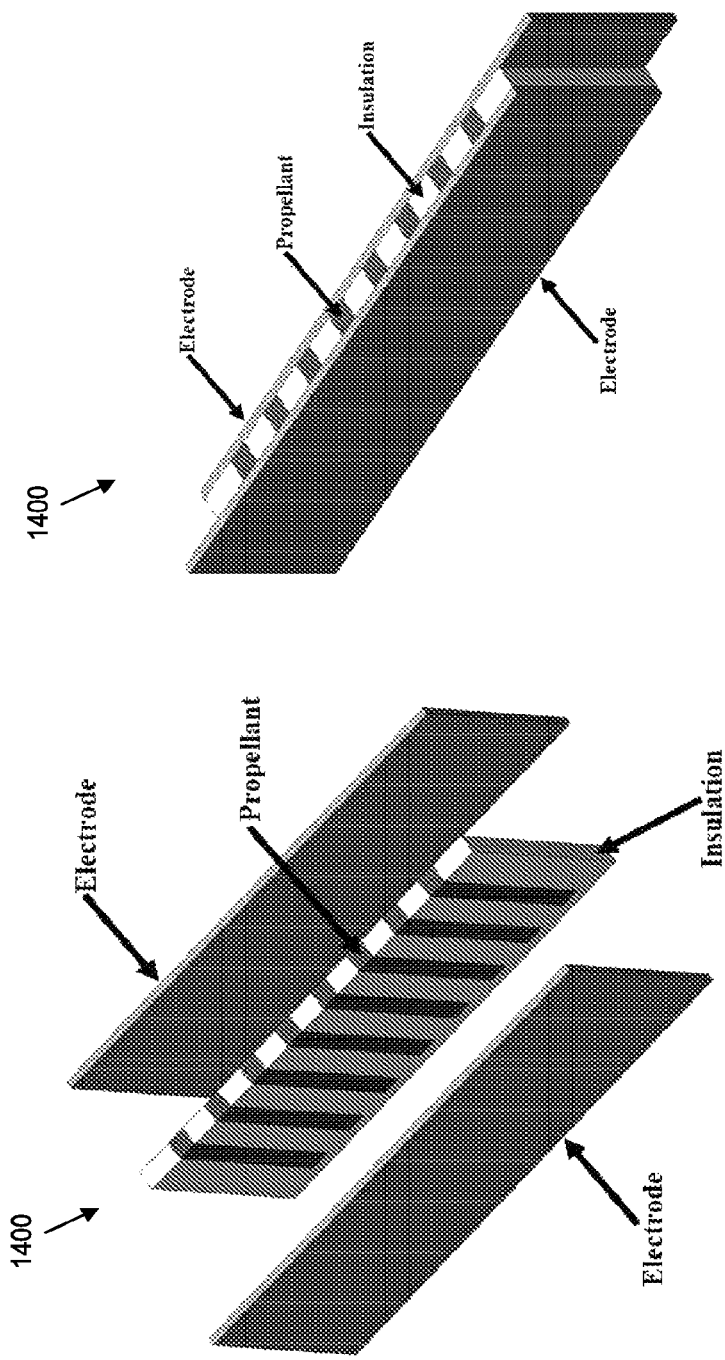
FIG. 14 illustrates an exemplary structure for initiation of electrically ignitable propellant.

According to another aspect described herein, multiple structures for igniting electrically ignitable propellant (e.g., structures 100, 200, 600, 700, 800, 900, 1000, 1200, or other structures described), may be combined into arrays of individually addressable grain elements. For example, FIG. 14 illustrates yet another exemplary structure 1400 for initiation of an electrically ignitable propellant, the structure including a series of propellant strips separated by insulation. Further, multiple grain elements or structures similar to those illustrated may be combined or stacked into a variety of thruster arrays suitable for various propulsion or gas generation devices. Additionally, various structures described with respect to solid propellants may generally be adapted for use with liquid propellants, and vice versa (of course, additionally structure such as seals may be needed to store liquid propellants).

Various other structures and configurations of electrodes, exhaust ports or cavities, multiple grain arrangements (including vertically stacked structures) are further described in copending patent application Ser. No. 11/305,742, which is incorporated herein by reference. Exemplary methods and structures described here allow for multiple thruster units to be manufactured simultaneously, reducing costs while providing redundancy. The examples are generally scalable and allow several different size thrusters to be included in a single assembly. The grain elements may be in direct contact with one another or separated by conductive electrodes or insulating layers as shown and described. Further, the electrodes may include conductive materials such as copper, aluminum, stainless steel, zirconium, gold, and the like. Insulator materials for the dies, casing, or to separate grains may include rubber, phenolic, Teflon®, ceramic, and the like. The electrode geometries may be configured to allow specific volumes or surfaces of propellant to be ignited individually and/or in combination to achieve desired thrust/gas generation control. Electrode geometry and/or conductive surface coatings can control propellant combustion either proceeding inward from surfaces or to instantaneously ignite specific volumes. Electrode surfaces may be varied from smooth to porous mesh changing the surface area in contact with the propellant. Once the hardware assemblage/stack is formed, the propellant can be added by casting with or without vacuum depending on scale. Additionally, mandrels may be used to control propellant casting as is known in the art.

It will be further appreciated that various additional features may be included or associated with the described structures, such as power supplies, controllers, electrical pins, connectors, housings, electrode structures, and the like. It will be appreciated that one may use a chamber die having a two-dimensional array of propellant chambers and stacking or layering grain elements as described herein to form a three-dimensional thruster array. Additionally, various other processing techniques may be used and the processing techniques described may be carried out in other orders or in parallel.

The above detailed description is provided to illustrate exemplary embodiments and is not intended to be limiting. It will be apparent to those skilled in the art that numerous modifications and variations within the scope of the present invention are possible. For example, various examples described herein may be used alone or in combination with other systems and methods, and may be modified for varying applications and design considerations. Accordingly, the present invention is defined by the appended claims and should not be limited by the description herein.

The invention claimed is:

1. Apparatus for providing electrically initiated and/or controlled combustion, the apparatus comprising:
   a volume of electrically ignitable propellant, wherein the electrically ignitable propellant is ignitable in response to the application of a current passing there through, and is further capable of self sustaining combustion;
   a pressurization device for increasing pressure on the electrically ignitable propellant, wherein a current required for igniting the electrically ignitable propellant is reduced with increased pressure, and the current required for igniting the electrically ignitable propellant is not met by the apparatus absent the increase in pressure from the pressurization device; and
   two electrodes operable to ignite the propellant.

2. The apparatus of claim 1, wherein the electrically ignitable propellant comprises liquid propellant.

3. The apparatus of claim 2, wherein the apparatus is operable to urge the liquid propellant into contact with the electrodes for combustion.

4. The apparatus of claim 1, wherein applying direct current to the electrodes causes combustion of the electrically ignitable propellant at the contact of a positive electrode with the electrically ignitable propellant.

5. The apparatus of claim 1, wherein applying alternating current to the electrodes causes combustion of the electrically ignitable propellant at the contact of both electrodes with the electrically ignitable propellant.

6. The apparatus of claim 1, wherein the electrically ignitable propellant is ignited by passing current there through via the electrodes.

7. The apparatus of claim 1, wherein at least one of the electrodes includes an insulator material insulating a portion of the electrode from the electrically ignitable propellant.

8. The apparatus of claim 1, further comprising a power source coupled to the electrodes and operable to vary current passing through at least a portion of the electrically ignitable propellant.

9. The apparatus of claim 1, wherein the pressurization device includes one or more of an explosive charge, shock impact, compressed gas, pneumatic pressurization, or valve device.

10. The apparatus of claim 1, wherein the two electrodes comprise coaxially disposed electrodes.

11. The apparatus of claim 1, wherein the two electrodes comprise wire electrodes.

12. The apparatus of claim 1, wherein the volume of electrically ignitable propellant comprises a cylindrical ring of propellant defining a core region, the core region operable to channel exhaust gasses from the assembly during combustion.

13. The apparatus of claim 1, further comprising a nozzle for passing combustion gases.

14. The apparatus of claim 13, wherein the electrodes extend through the nozzle for causing ignition of propellant passing there through.

15. The apparatus of claim 1, further comprising an exhaust region for passing combustion gases, wherein the electrodes extend through the exhaust region for causing ignition of propellant passing there through.

16. The apparatus of claim 1, further comprising a projectile operable to be propelled by combustion of the electrically ignitable propellant.

* * * * *